United States Patent [19]

Oikawa et al.

[11] Patent Number: 4,966,374
[45] Date of Patent: Oct. 30, 1990

[54] GROMMET

[75] Inventors: Ryuetsu Oikawa; Akira Ikari; Touru Sasaki, all of Shizuoka, Japan

[73] Assignee: Yazaki Corporation, Tokyo, Japan

[21] Appl. No.: 286,264

[22] Filed: Dec. 16, 1988

[30] Foreign Application Priority Data

Dec. 16, 1987 [JP] Japan ................. 62-316015

[51] Int. Cl.⁵ .......... F16L 5/02; H01B 17/26
[52] U.S. Cl. ................. 277/178; 174/153 G; 277/193; 277/199
[58] Field of Search ........... 277/165, 178, 193, 199; 16/2; 248/56; 174/65 G, 153 G

[56] References Cited

U.S. PATENT DOCUMENTS

| | | | |
|---|---|---|---|
| 2,418,105 | 3/1947 | Wohler | 16/2 |
| 2,762,118 | 9/1956 | Saw et al. | 16/2 |
| 3,240,502 | 3/1966 | Snyder | 277/178 |
| 3,631,738 | 1/1972 | Harper | 174/656 |
| 3,958,300 | 5/1976 | Tanaka | 174/153 G |
| 4,216,930 | 8/1980 | Rossler, Jr. et al. | 174/153 G |
| 4,640,479 | 2/1989 | Shely et al. | 174/153 G |
| 4,645,284 | 2/1989 | Duplatre et al. | 174/656 |
| 4,678,146 | 7/1987 | Plyler | 174/153 G |
| 4,839,937 | 6/1989 | Oihawa et al. | 174/153 G |

FOREIGN PATENT DOCUMENTS

| | | |
|---|---|---|
| 2904636 | 8/1979 | Fed. Rep. of Germany ... 277/DIG. 5 |
| 1046983 | 7/1953 | France ................. 16/2 |
| 155783 | 10/1984 | Japan . |

OTHER PUBLICATIONS

English Translation of Japanese Utility Model Appln. No. 155783/84.

Primary Examiner—Allan N. Shoap
Assistant Examiner—Daniel G. DePumpo
Attorney, Agent, or Firm—Sughrue, Mion, Zinn, Macpeak & Seas

[57] ABSTRACT

A grommet for preventing water from leaking through the hole of a panel having a hard portion 10 made of a hard material and fixedly fitted in the hole of a panel, and a soft portion 20 made of a soft material and including an electric cord insertion part 23 and a waterproofing part 24. The hard portion is composed of a plurality of split parts whose coupled faces are provided with guide bars 16 and guide holes 17 in which the bars are slidably fitted so that the split parts can be moved away from each other in an expansionary manner as they remain coupled to each other to allow for insertion of the cord.

8 Claims, 9 Drawing Sheets

GROMMET

BACKGROUND OF THE INVENTION

1. Field Of The Invention

The present invention relates to a grommet for preventing water or the like from entering through the hole of a panel, through which an electric cord is inserted.

2. Description of the Prior Art

FIGS. 1, 2, 3 and 4 show a conventional grommet comprising a soft portion 60 made of a rubber or the like and having an electric cord inserting part 63' and a hard portion 50 made of a hard synthetic resin or the like and fitted in the hole of a panel as disclosed in the Japanese Utility Model Application (OPI) No. 155783/84 (the term "OPI" as used herein means an "unexamined published application"). The hard portion 50 includes a body 52 having a cord inserting hole 51 and a peripheral wall 53 provided on the peripheral part of the body and having a cross section of relatively small curvature, and an annular base plate 54 secured to the bottom of the peripheral wall. The hard portion 50 consists of two split parts 50a and 50b. The soft portion 60 includes a body 61 having a recess 62, in which the annular base plate 54 of the hard portion 50 is fitted the electric cord inserting part 63 cylindrically shaped and having an electric cord clamping section (not shown in the drawings) on the inside circumferential surface of the cord laying part, and a waterproofing part 64 including inner and outer circumferential lips provided at the peripheral edge of the top of the body 61. Engaging tongues 55 are provided in a flexible manner on the peripheral wall 53 of the hard portion 50. In order to fasten the grommet to the panel, the soft portion 60 is first expanded by an expander A. and an electric cord B. comprising electric wires C and a connector D is then inserted through the soft portion as shown in FIG. 2. Thereafter the expander A is removed, and both the split parts 50a and 50b of the hard portion 50 are combined with each other so that the electric wires C are located between the split parts as shown in FIG. 3. The hard portion 50 is then fitted in the recess 62 of the soft portion 60, as shown in FIG. 4. Subsequently, the body 52 of the hard portion 50 is pushed into the hole of the panel so that the peripheral wall 53 of the body is fitted in the hole, the engaging tongues 55 are engaged on the circumferential edge of the panel around the hole, and the waterproofing part 64 is tightly fitted on the panel around the hole.

Since the hard portion 50 of the conventional grommet cannot be expanded by the expander A to permit insertion of the electric cord B through the hard portion the split parts 50a and 50b of the hard portion need to be combined with each other and fitted in the soft portion 60 after the soft portion is expanded by the expander and the electric cord is inserted through the soft portion. For that reason, the conventional grommet has a problem that the efficiency of inserting the electric cord through the grommet is low.

SUMMARY OF THE INVENTION

The present invention was made in order to solve the above-mentioned problem.

Accordingly, it is an object of the present invention to provide a grommet which can be expanded by an expander as the hard portion of the grommet remains fitted in the soft portion thereof thus enhancing the efficiency of inserting an electric cord through the grommet.

The grommet provided in accordance with the present invention comprises a hard portion made of a hard material and fixedly fitted in the hole of a panel, and a soft portion made of a soft material and including an electric cord inserting part and a waterproofing part. The grommet is characterized in that the hard portion includes a plurality of split parts whose mutually coupled faces are provided with guide bars and guide holes in which the guide bars are slidably fitted so that the split parts can be moved away from each other in an expansionary manner as they remain coupled to each other. Therefore, the guide bars do not slide off the guide holes when the split parts are moved away from each other in the expansionary manner so that the electric cord can be inserted through the grommet.

When the grommet provided in accordance with the present invention is expanded by the expander as the hard portion of the grommet remains fitted in the soft portion thereof the guide bars are slid in the guide holes so that the tips of the bars are moved toward the open ends of the guide holes and the hard and the soft portions are expanded together as the split parts of the hard portion remain coupled to each other because of the guide bars remaining fitted in the guide holes. The electric cord is then inserted through the expanded grommet. When the expander is thereafter removed from the grommet, the soft portion returns to the original state thereof due to the restoring resilient force thereof and the guide bars of the split parts of the hard portion of the grommet slide in the guide holes of the split parts due to the restoring resilient force of the hard portion, an external force or the like so that the tips of the guide bars are moved toward the inner ends of the guide holes, the split parts are moved toward each other and the hard portion returns to the original state thereof.

BRIEF DESCRIPTION OF THE DRAWINGS

FIG. 15(a) is a perspective view of segments, and FIGS. 15(b) and 15(c) are illustrations of the operation for connecting the segments.

BRIEF DESCRIPTION OF THE INVENTION

Embodiments of the present invention are hereafter described with reference to the drawings attached hereto.

Figure 1:
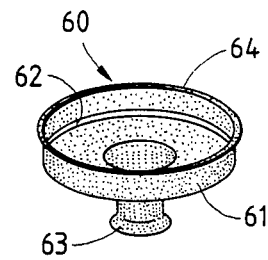
FIG. 1 shows a perspective view of the soft portion of a conventional grommet.
Figure 2:
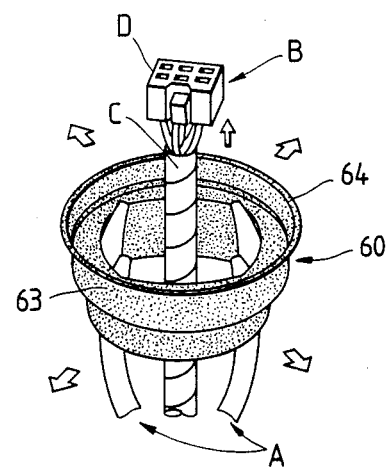
FIG. 2 shows a perspective view for describing insertion of an electric cord through the conventional grommet.
Figure 3:
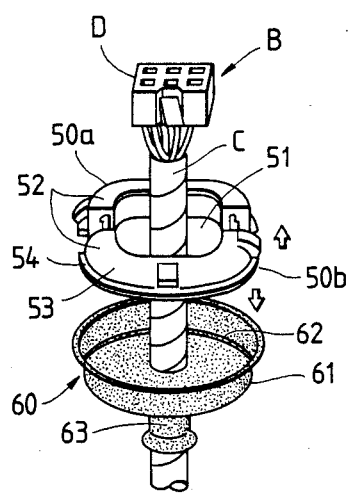
FIG. 3 shows a perspective view for describing fitting the hard portion of the conventional grommet in the soft portion thereof.
Figure 4:
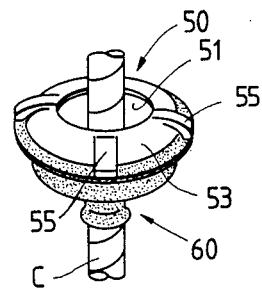
FIG. 4 shows a perspective view of the conventional grommet with the electric cord inserted through it.
Figure 5:
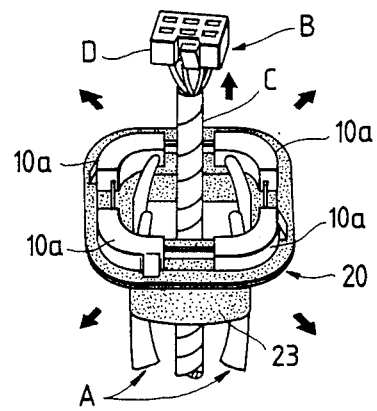
FIG. 5 shows a perspective view for describing insertion of an electric cord through a grommet which is an embodiment of the present invention.
Figure 7:
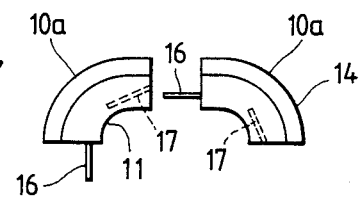
FIG. 7 shows a plan view of split parts of the hard portion of the grommet.
Figure 8:
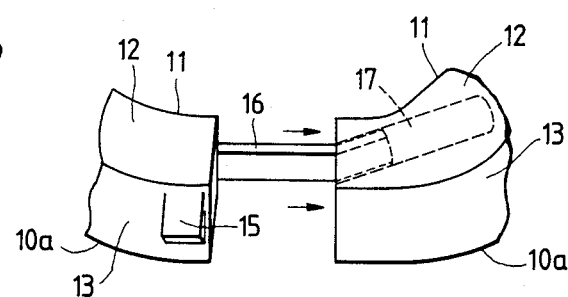
FIG. 8 shows a perspective view for describing the relationship between the guide bar and guide hole of the split parts.

FIGS. 5. 6(a), 6(b), 7 and 8 show a grommet which is one of the embodiments. The grommet comprises a hard portion 10 made of a hard material such as a hard synthetic resin fixedly fitted in the hole of a panel, and a soft portion 20 made of a soft material such as a rubber and including an electric cord insertion part 23 and a waterproofing part 24. The hard portion 10 and the soft portion 20 are combined with each other to constitute the grommet. What is important about the grommet is that both the hard portion 10 and the soft portion 20 fitted therewith can be expanded together by an expander A to insert an electric cord B through the grommet. For that purpose the hard portion 10 is composed of four split parts 10a each provided with a guide bar 16 at one end of the split part and with a guide hole 17 at the other end of the part, as shown in FIG. 7, so that the guide bar is slidably fitted in the guide hole. When the split parts 10a are separated from each other to make it possible to insert the electric cord B through the grommet the tips of the guide bars 16 are slid to the open ends of the guide holes 17 but the guide bars do not slide off the guide holes. In other words the guide bars 16 and the guide holes 17 are made relatively long so that the split parts 10a can be moved away from each other in an expansionary manner while they remain coupled to each other.

Figure 6A:
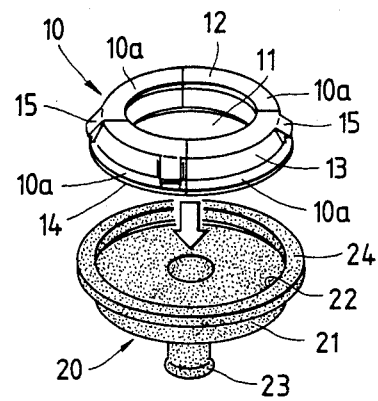
FIG. 6(a) shows a perspective view of the still mutually-unfitted hard and soft portions of the grommet.
Figure 6B:
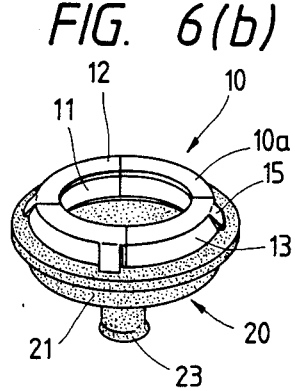
FIG. 6(b) shows a perspective view of the already mutually-fitted hard and soft portions of the grommet.

In order to insert the electric cord B through the grommet, the hard portion 10 is first fitted in the soft portion 20 as shown in FIGS. 6(a) and 6(b). When both the hard portion 10 and the soft portion 20 are then expanded by the expander A. the tips of the guide bars 16 are slid toward the open ends of the guide holes 17 and the split parts 10a are moved away from each other in four directions in an expansionary manner as shown by arrows in FIG. 5. The electric cord B is then inserted through the grommet as shown in FIG. 5. When the expander A is thereafter removed from the grommet the soft portion 20 returns to the original state thereof due to the restoring resilient force thereof. That is, the ends of the guide bars 16 are slid toward the inner ends of the guide holes 17 by the force of the soft portion an external force or the like, and the split parts 10aare moved toward each other so that the grommet returns to the original state thereof. Therefore, it is not necessary to expand the soft portion 20 by the expander A and insert the electric cord B through the grommet and thereafter fit the hard portion 10 in the soft portion.

The hard portion 10 includes a body 12 having a cord insertion hole 11 and a peripheral wall 13 provided on the peripheral part of the body and having a cross section of relatively small curvature and an annular base plate 14 secured to the bottom of the peripheral wall, as shown in FIG. 6(a). The soft portion 20 includes a body 21 having a recess 22 in which the annular base plate 14 is fitted, a cylindrical electric cord insertion part 23 provided at the central part of the bottom of the body 21 and having an electric cord clamping section (not shown in the drawings) on the inside circumferential surface of the cord insertion part, and a waterproofing part 24 provided at the circumferential edge of the top of the body 21 and composed of inner and outer circumferential lips. In these respects, the grommet is the same as the above-described conventional grommet. Engaging tongues 15 are provided in a flexible manner on the peripheral wall 13 of the hard portion 10 so that the tongues are engaged on the circumferential edge of the panel around the hole when the grommet is fitted in the hole of the panel. In this respect as well, the grommet is the same as the conventional grommet.

Figure 9:
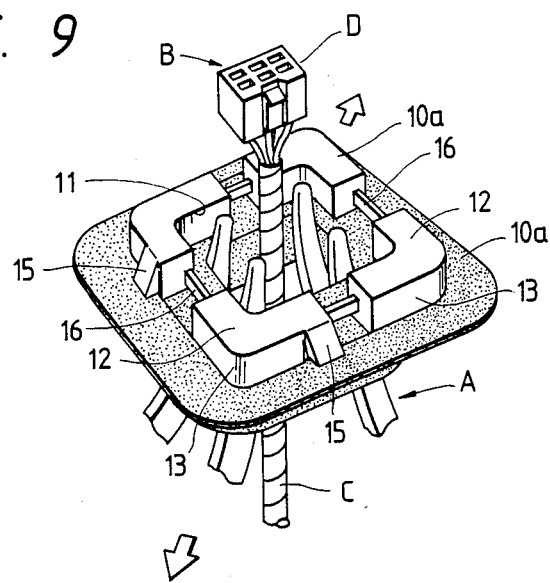
FIG. 9 shows a perspective view for describing insertion of an electric cord through a grommet which is another embodiment of the present invention.
Figure 10:
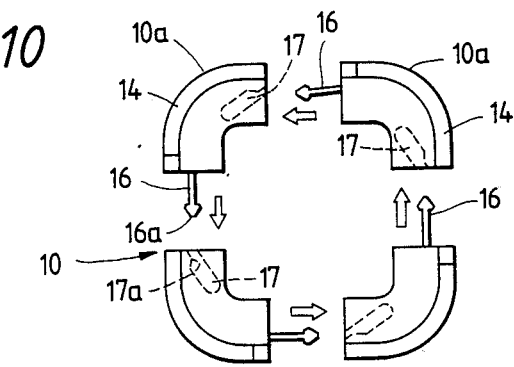
FIG. 10 shows a plan view of the split parts of the hard portion of the grommet shown in FIG. 9.
Figure 11:
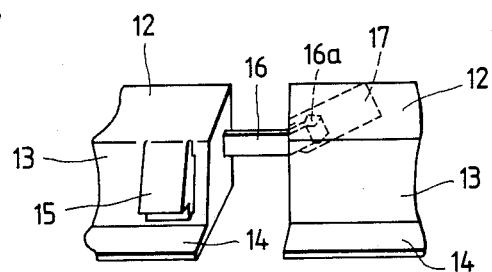
FIG. 11 shows a perspective view for describing the relationship between the engaging projections of the guide bar and guide hole of the split parts shown in FIG. 10.
Figure 12A:
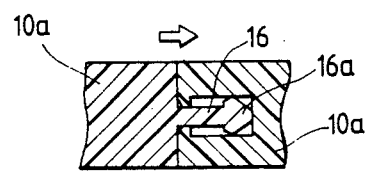
FIGS. 12(a) and 12(b) show partial sectional views for describing the relationship between the engaging projections shown in FIG. 11.
Figure 12B:
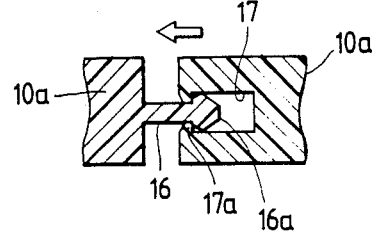
Figure 13:
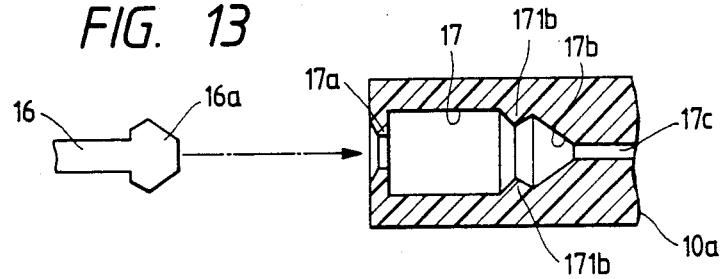
FIG. 13 shows a partially sectional view of the guide bar and guide hole of a grommet which is yet another embodiment of the present invention.

FIGS. 9, 10. 11, 12(a) and 12(b) show a grommet which is another one of the embodiments. The same reference symbols in FIGS. 5. 6(a), 6(b), 7, 8, 9, 10, 11, 12(a) and 12(b) denote the mutually corresponding portions and parts shown therein. In the grommet, guide bars 16 are provided with engaging projections 16a at the ends of the bars, and guide holes 17 are provided with engaging projections 17a at the open ends of the holes, so that the engaging projections 16a can be engaged with the other engaging projections 17a. For that reason, even if the hard portion 10 of the grommet is mistakenly overexpanded by an expander A, the engaging projections 16a engage with the other engaging projections 17a. to prevent the guide bars 16 from sliding off the guide holes 17. The reason why the engaging projections 16a and 17a are provided in the grommet is that if the guide bar 16 came off the guide hole 17 in laying an electric cord B through the grommet, it would be troublesome to insert the guide bar back into the guide hole to return the hard portion 10 into the original state thereof, after laying the electric cord through the grommet.

FIGS. 13, 14(a), 14(b) and 14(c) show a grommet which is yet another one of the embodiments. The same reference symbols in FIGS. 5, 6(a), 6(b), 7, 8, 13, 14(a). 14(b) and 14(c) denote the mutually corresponding portions and parts shown therein. In the grommet, guide holes 17 have engaging parts 17b at the inner ends of the holes so that the engaging projections 16a of guide bars 16 can be removably engaged in the engaging parts. Slits 17c are also provided in split parts 10a to make it possible to engage the engaging projections 16a in the engaging parts 17b. The engaging parts 17b and the slits 17c are provided in the split parts 10a because the guide bars 16 bend as they are moved deeper toward the inner ends of the guide holes 17 causing the split parts to move away from each other due to the restoring resilient forces of the guide bars. Therefore without the engaging part 17b and the slits 17c it would be difficult to fit the hard portion of the grommet in the soft portion thereof. However, according to the invention, the engaging projections 16a are engaged in the engaging parts 17b of the guide holes 17 so that the split parts 10a are not moved away from each other as a result of the restoring resilient forces of the guide bars 16. As a result, it is easy to fit the hard portion of the grommet in the soft portion thereof. Since the height of each of engaging projections 17a provided at the outer ends of the guide holes 17 is larger than the height of each of projections 171b provided at the outer ends of the engaging parts 17b of the guide holes and the engaging parts 16b are expandable due to the slits 17c. the engaging projections 16a of the guide bars 16 can be easily disengaged from the engaging parts 16b when the grommet is expanded by an expander. In the grommet, the engaging projections 16a are stopped by engaging with the engaging projections 17a at the time of the expansion of the grommet by the expander, to prevent the guide bars 16 from sliding off the guide holes 17, in the same manner as the grommet shown in FIGS. 5, 6, 7, 8(a) and 8(b).

In the foregoing embodiments, since the guide projections 16 and the guide holes 17 are formed linearly, the guide projections 16 would be brought into frictional contact with the inner walls of the guide holes 17 to bend or flex when the respective split parts 10a are expanded away from each other in the four directions (see FIG. 5) by the expander A or when the split parts 10a are returned closed to each other by removing the expander A. For this reason, a thickness of the guide projections is decreased to facilitate the expansion operation. However, this causes the mechanical strength of the projections to decrease. In particular, if an undesired twist wold be applied to the projections 16 during the expansion by the expander A, the projections 16 would be damaged or deformed, resulting in harshness of the opening and closing operations.

Figure 15A:
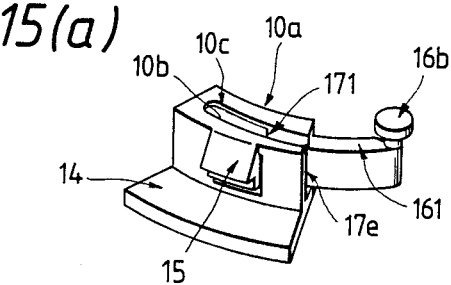
FIG. 15(a) to (c) show a fourth embodiment of the invention.
Figure 15B:
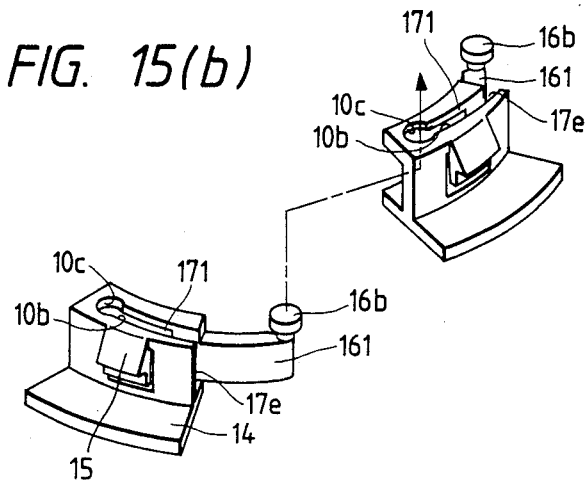
Figure 15C:
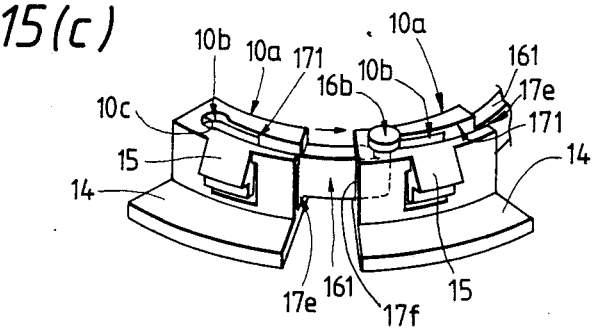

FIGS. 15(a) to (c) show an embodiment in which the above-noted defect may be overcome. In this embodiment, the same reference numerals are used to denote the like components or members in the foregoing embodiments.

In FIGS. 15(a) to (c), the guide projections 161 and the guide holes 171 are curved at substantially the same curvature so that the projections may be slid within the guide holes without any bend or flexture when the respective split parts 10a are opened or closed by the operation of the expander A.

Since the guide projections 161 may be slid within the guide holes 171 without any bend or flexture, the wall thickness of the projections is selected to a greater level than that of the foregoing embodiments.

Also, the hard grommet 10 is divided into eight segments 10a. An opening end 17e and another opening end 17f are formed at one end and another end of the respective segments 10a Each guide projection 161 extends from the opening end 17e at one end side of the segment 10a at substantially the same curvature. A projected portion 16b is implanted at the end portion of the projection 161 A slit 10b is formed in a lower end face (an upper end face in FIGS. 15(a) to (c) so as to be in communication with an along with the guide hole 17. Thus, the projected portion 16b may be slid within the slit 10b. A retainer hole 10c with which the projected portion 16b engages is formed at the end portion of the segment 10a.

A retainer piece 15 is formed on a circumferential wall of each segment 10a.

In order to connect the respective segments 10a, first, the projected portion 16b of one segment 10a is inserted into the retainer hole 10c of another segment 10a as shown in FIG. 15(b). At the same time, the end portion of the guide projection $16_1$ is inserted into the opening end $17f$ of the guide hole $17_1$ (see FIG. 15(c)). Subsequently, as shown in FIG. 15(a), the projected portion 16b and the guide projection $16_1$ are slid into the slit 10b and the guide hole 17, respectively, as indicated by the arrows to make the respective segments 10a close to each other.

Figure 16:
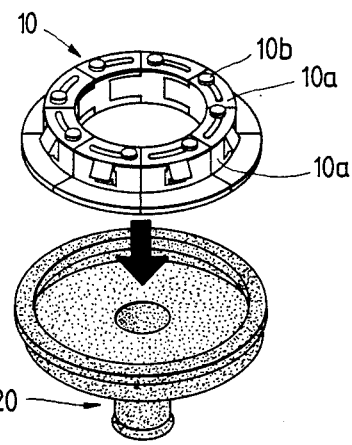
FIG. 16 is an illustrative perspective view of inserting a hard grommet into a soft grommet.
Figure 17:
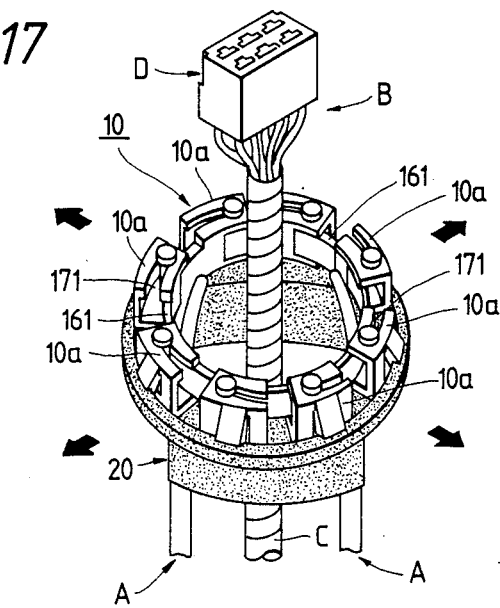
FIG. 17 is a perspective view showing the operation for inserting the wire harness into the grommets.
Figure 18A:
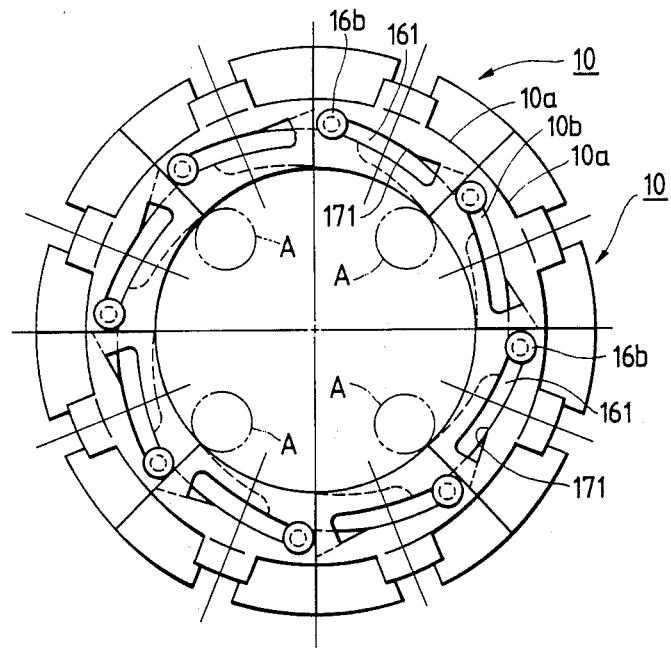
FIGS. 18(a) and 18(b) are a plan view of the hard grommet, and a side elevational view of the hard grommet shown in FIG. 18(a), respectively.
Figure 18B:
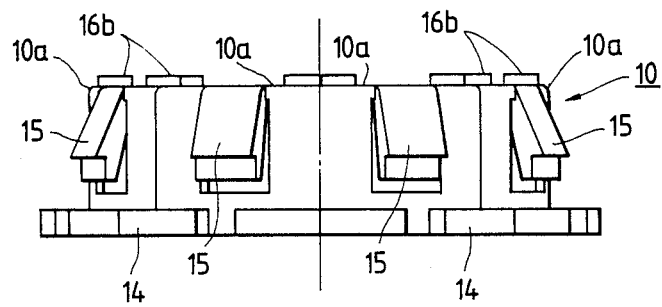

Thus, the hard grommet 10 is formed as shown in FIGS. 18(a) and (b). This hard grommet is engaged with the soft grommet 20 in the same manner as the foregoing embodiments (see FIG. 16). Also, when the wiring harness B is to be inserted into the grommets, the soft and hard grommets are expanded by using the expander A as shown in FIG. 17.

Figure 19A:
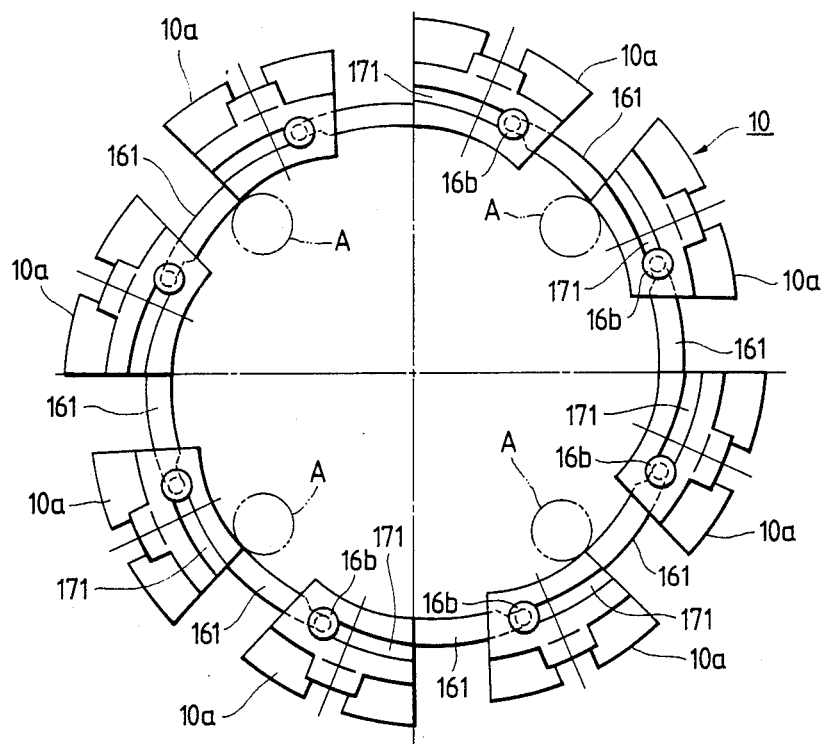
FIGS. 19(a) and 19(b) are a plan view of the hard grommet under the opened state, and a side elevational view of the hard grommet shown in FIG. 19(a).
Figure 19B:
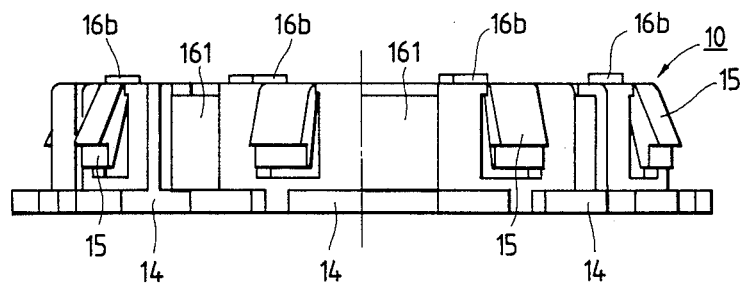
Figure 20:
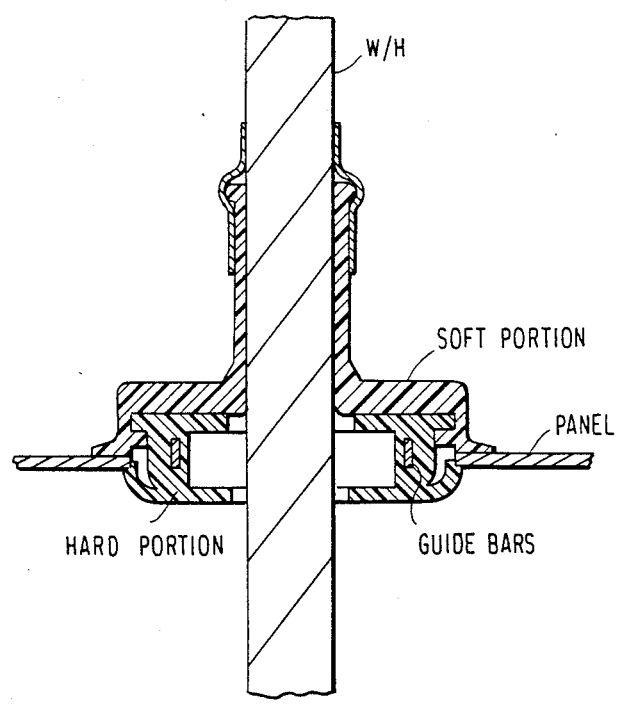
FIG. 20 is a cross-sectional view of the grommet.

FIGS. 19(a) and (b) show the hard grommet 10 expanded at a maximum level. The projected portion 16b of one segment 10a is engaged with the retainer hole 10c of another segment 10a located adjacent to each other, to thereby prevent the guide projection $16_1$ from releasing away from the guide hole $17_1$. Thus, the segments are not completely separated from each another FIG. 20 is a cross-sectional view of the grommet.

As described above, in the fourth embodiment, since the guide projections $16_1$ and the guide holes $17_1$ are curved so that the guide projections and guide holes may be slid relative to each other without any bend or flexture upon the opening and closing operations of the expander, it is possible to perform the coupling operation of the grommets without any harshness in comparison with the foregoing embodiment.

Figure 14A:
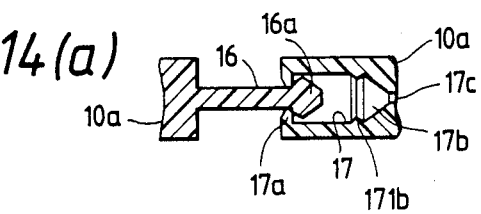
FIG. 14(a). 14(b) and 14(c) show partial sectional views for describing the relationship between the engaging projections of the guide bar and guide hole of split parts of the grommet shown in FIG. 13, and that between the engaging projection of the guide bar and the engaging part of the guide hole.
Figure 14B:
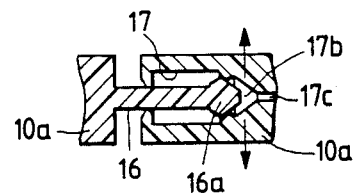
Figure 14C:
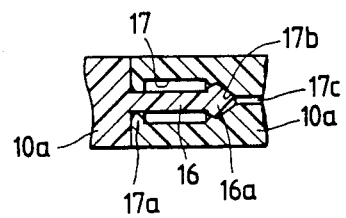

Also, when the segments 1a are close to each other by removing the expander A, the respective segments 10a would not be completely separated away from each other due to the resilient returning force of the guide projections $16_1$. Therefore, it is possible to dispense with the retaining portions 16a and retaining holes 17b as shown in FIGS. 14(a) to (c).

Also, according to the fourth embodiment, since the wall thickness of the projection guides $16_1$ may be increased, it is possible to prevent the damage or deformation due to the undesired twist force.

Also, the number of the segments or split parts may be selected as desired.

Although the hard portion 10 in each of the above-described embodiments is composed of four split parts 10a. the present invention is not confined thereto but may be otherwise embodied so that the hard portion is composed of two, three, five or other numbers of split parts.

According to the present invention, the hard portion of a grommet is composed of a plurality of split parts whose mutually coupled faces are provided with guide bars and guide holes in which the guide bars are slidably fitted so that the split parts can be moved away from each other in an expansionary manner as they remain coupled to each other. For that reason, the grommet can be expanded by an expander as the hard portion of the grommet remains fitted in the soft portion thereof. The efficiency of inserting an electric cord through the grommet is thus enhanced.

What is claimed is:

1. A grommet adopted to prevent water from leaking through the hole of a panel, comprising:
    a hard portion made of a hard material and fixedly fitted in the hole of a panel; and
    a soft portion made of a soft material and including an electric cord insertion part and a waterproofing part, said hard portion being composed of a plurality of split parts whose mutually coupled faces are provided with guide bars and provided with guide holes having an open and a closed end, said guide bars being respectively slidably fitted in said guide holes so that said split parts can be moved away from each other in an expansionary manner as they remain coupled to each other.

2. The grommet of claim 1, wherein each of said guide bars has an engaging projection circumscribing a tip thereof and each of said guide holes has a corresponding projection provided at an inner circumference of said open end thereof such that said projections prevent said guide bars from disengaging said guide holes when said split parts are moved away from each other.

3. The grommet of claim 2, wherein each of said guide holes has an engaging part at said closed end thereof for securely receiving said engaging projection of said guide bars when said split parts are adjacent one another.

4. The grommet of claim 3, wherein said engaging part is defined by a rib circumscribing the interior of said guide hole.

5. The grommet of claim 4, wherein each of said guide holes has a slotted portion at the closed end thereof such that said split parts do not expand when said engagement projection of said guide bar is received in said engaging part of said guide hole.

6. The grommet of claim 1, wherein said guide bars and said guide holes are curved at substantially the same curvature.

7. The grommet of claim 6, wherein each of said guide bars has an engaging projection on its bottom face and each of said guide holes has a corresponding retaining part for engaging said projection.

8. The grommet of claim 1, wherein said plurality of parts comprises at least three parts.

* * * * *